United States Patent [19]
Hoffmann

[11] 3,751,578
[45] Aug. 7, 1973

[54] METAL-CLAD THREE-CONDUCTOR HIGH-VOLTAGE TRANSMISSION LINE

[75] Inventor: Fritz Hoffmann, Rheinheim, Germany

[73] Assignee: Siemens Aktiengesellschaft, Munich, Germany

[22] Filed: Mar. 27, 1972

[21] Appl. No.: 238,405

[30] Foreign Application Priority Data
Apr. 8, 1971 Germany.................. P 21 18 176.0

[52] U.S. Cl. ............... 174/99 B, 174/16 B, 174/24, 174/149 B
[51] Int. Cl. ....................... H01b 9/06, H01b 17/18
[58] Field of Search............... 174/99 R, 99 B, 16 B, 174/16 R, 24, 27, 15 C, 149 B

[56] References Cited
UNITED STATES PATENTS

| | | | |
|---|---|---|---|
| 3,349,168 | 10/1967 | Rehder et al...................... | 174/99 B |
| 1,851,939 | 3/1932 | Williams........................... | 174/99 R |
| 3,164,667 | 1/1965 | Frowein............................ | 174/27 |

FOREIGN PATENTS OR APPLICATIONS

| | | | |
|---|---|---|---|
| 1,448,008 | 6/1966 | France.............................. | 174/99 B |
| 1,109,377 | 4/1968 | Great Britain.................... | 174/99 B |

Primary Examiner—Bernard A. Gilheany
Assistant Examiner—A. T. Grimley
Attorney—Hugh A. Chapin

[57] ABSTRACT

The three conductors of the high voltage transmission line are arranged in triangular array within the metal-clad casing and are supported at longitudinally spaced apart points. At each support point, three insulator bodies are provided so that each conductor is supported by a single insulator body. Each insulator body surrounds one conductor, at least partially, and is attached at two points of the metal casing which are separated from each other by at least an angle of 90° relative to the periphery of the casing.

14 Claims, 3 Drawing Figures

METAL-CLAD THREE-CONDUCTOR HIGH-VOLTAGE TRANSMISSION LINE

FIELD OF THE INVENTION

The invention relates to metal-clad three conductor high voltage transmission lines, and more particularly, to the mounting of the conductors within a casing of the transmission line.

BACKGROUND OF THE INVENTION

Heretofore, three-conductor high-voltage transmission lines have been known to have cylindrical metal-clad casings, or the like encapsulation, in which three, preferably tubular, high-voltage conductors are arranged at the corners of a triangle. In most cases, these high-voltage transmission lines have been constructed with pressurized-gas insulation. In addition, these lines can function particularly as a three-conductor bus bar system in which case, branch lines are brought out from the cylindrical casing at regular, relatively close intervals.

In order to orient the conductors within the casing, various structures have been used. For example, in a three-phase bus bar system known from the German published Patent Application No. 1,194,026, the high-voltage conductors have been mounted in a symmetrical arrangement by support insulators which engage each high voltage conductor on two sides. These support insulators have each been attached at the end remote from the conductor to partitions which are accommodated in the casing in star fashion at a mutual angle of 120° and define a separate gas space for each high-voltage conductor. However, this arrangement requires a relatively large number of individual parts, particularly as adjustment means are provided at the junction between the conductor and the support insulator. Moreover, the partitions and attachment means can affect the dielectric strength so that use at very high voltages, for instance, of 110 kilovolts (kV) may not be possible.

High-voltage lines have also been known in which the high voltage conductors are held in place by ring-shaped bodies of insulating material which are common for all three conductors and are attached unilaterally to the casing. However, in these cases, the leakage paths have been so short as to create a possibility of phase short circuits occurring.

Accordingly, it is an object of the invention to reduce the cost required for a three-conductor high-voltage transmission line without sacrificing dielectric strength.

It is another object of the invention to provide a high-voltage transmission line which is mechanically sufficiently strong to withstand particularly the electrodynamic forces in the case of a short circuit.

SUMMARY OF THE INVENTION

Briefly, the invention provides a three-conductor high-voltage transmission line which is encapsulated in a cylindrical metal casing with three insulator bodies at each support point. Each insulator body individually surrounds one high-voltage conductor at least partially and is attached at the ends to two points of the metal casing so as to be disposed in chordal fashion relative to the cross-section of the casing which are separated from each other at least by an angle of 90° at the circumference of the casing.

As the insulating bodies are attached only at the casing there is no need of any partitions, arranged in star-fashion. Further, as the leakage and breakdown paths at the insulator body are relatively long due to the fact that the attachment points are displaced by at least an angle of 90° at the circumference of the casing, the dielectric strength of the mounting arrangement is adequate. In this respect, it is noted that these paths are longer than in arrangements where the high-voltage conductors are supported by support insulators which extend radially toward the axis of the casing. Also, in contrast to transmission lines which utilize ring-shaped bodies of insulating material, the danger of phase short circuits due to leakage paths is substantially reduced, as the paths along the surfaces of the insulating material between the phase conductors are about twice as long.

According to the invention, symmetrical arrangements are preferably chosen in which all insulator bodies are identical. In one embodiment, the insulator bodies are attached at the metal casing by a fastening means which is common to two respective insulator bodies and at points displaced by an angle of 120° at the circumference. The fastening means is, for example, in the form of a screw which secures two adjacent insulator bodies against a projection which is situated between the insulator bodies and is connected with the casing. The projection can be an integral portion of the casing.

Alternatively, an elastic connection can be used to secure the insulator bodies to the casing. To this end, a rubber member which is advantageously made more or less conductive by the addition of graphite or silicon carbide (SiC), is disposed between two adjacent insulator bodies so as to be deformed against the inside of the casing when the insulator bodies are screwed together. Similar fastening means can also be provided in the vicinity of the high-voltage conductor, so that a vibration-damping, resilient but sufficiently secure attachment is obtained.

The insulator bodies are preferably constructed in a symmetrical fashion with two arms curved in the same sense as the metal casing. Such a curvature results in an increase of the leakage path, as will be explained in further detail below. Particularly advantageous are insulator bodies which are shaped in the cross-section perpendicular to the longitudinal axis of the high-voltage conductors. In this way, high strength can be obtained with a low expenditure for material. The insulator bodies can also have cutouts over most of the cross section and, in such a case, it is adviseable to connect the legs surrounding the cutouts in the vicinity of the high-voltage conductor so as to form a ring for enclosing the conductor. The ring can then provide the reinforcement necessary for a clamping connection. At the other end, i.e. in the vicinity of the attachment point at the casing, a reinforcement can be obtained by making the height of the cross section of the insulator body decrease from the high-voltage conductor toward the attachment point in such a manner that the legs merge into each other at the attachment point. A "free-supported beam" or simple beam is thus obtained with an approximately uniform distribution of the largest mechanical stresses.

These and other objects and advantages of the invention will become more apparent from the following de-

DESCRIPTION OF THE PREFERRED EMBODIMENT

Figure 1:
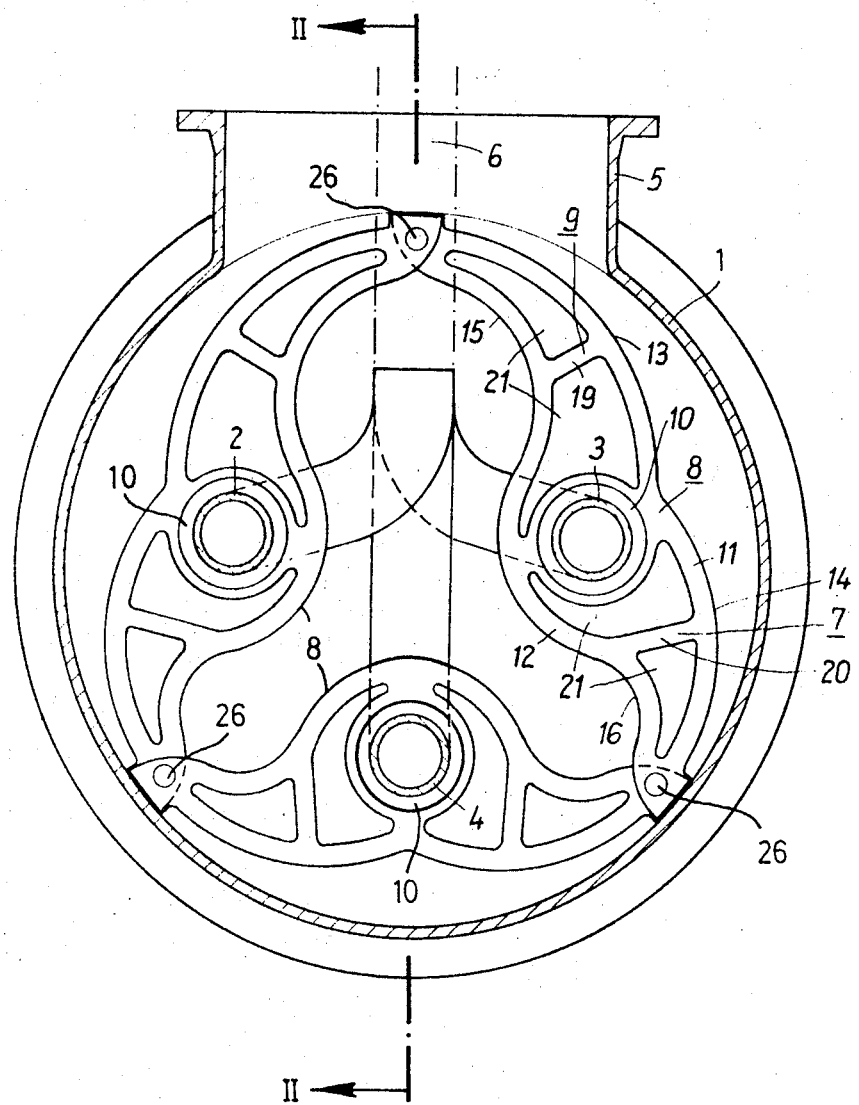
FIG. 1 illustrates a cross-sectional view taken on line 1—1 of FIG. 2 of a three-conductor high-voltage transmission line utilizing insulator bodies according to the invention.
Figure 2:
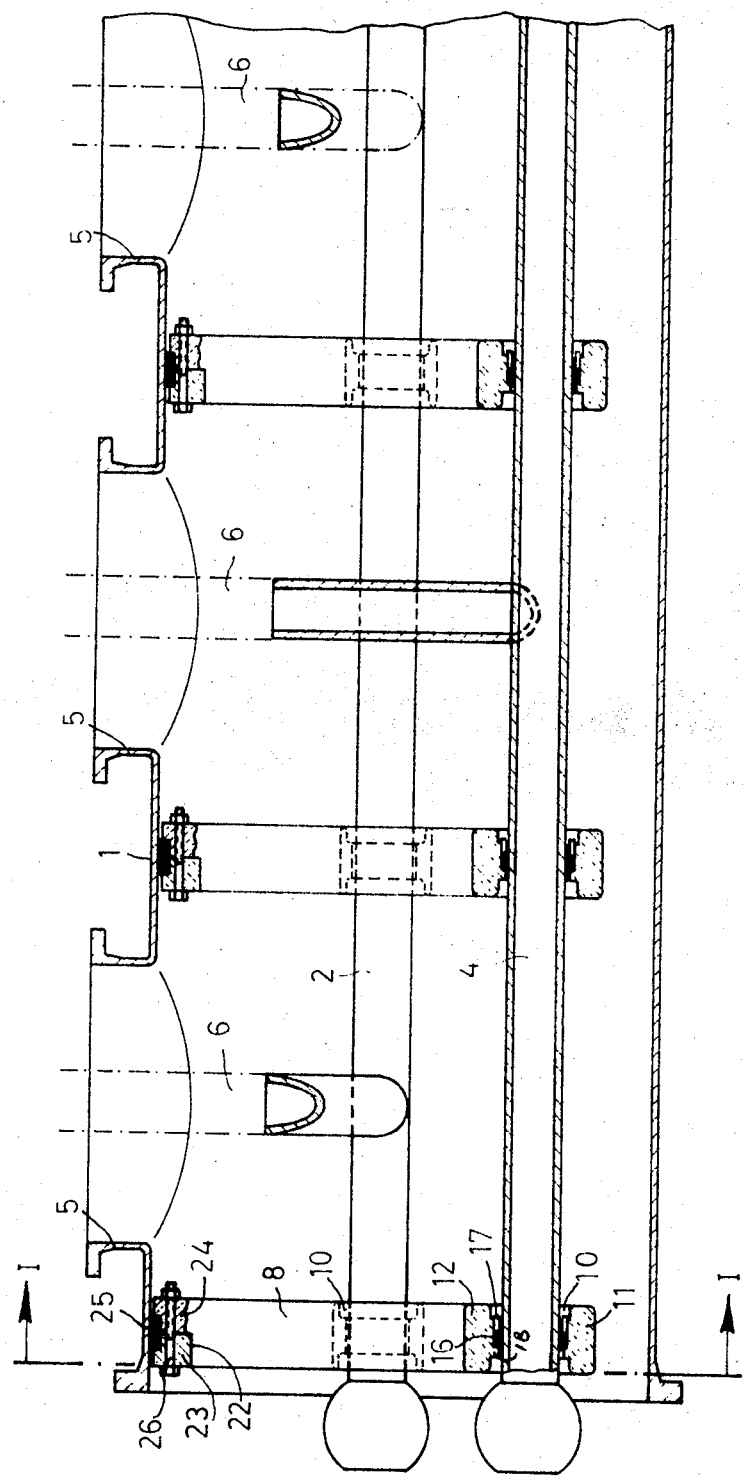
FIG. 2 illustrates a cross-sectional view taken on line 2—2 of FIG. 1.

Referring to FIGS. 1 and 2, the three-conductor high-voltage transmission line for carrying, for example 110 kilovolts (kV), can be part of a pressurized gas-insulated high voltage switching station. For example, the line can be the bus bar of a three-phase system.

Referring to FIG. 1, the transmission line includes a cylindrical metal casing 1 which is at ground potential. The casing 1 serves to encapsulate three high-voltage conductors 2, 3 and 4 at the corners of an isosceles triangle with respect to the longitudinal axis of the casing 1. In addition, a number of aligned cylindrical T-connectors 5, each of which is used to enclose a branch conductor 6 for each conductor 2, 3, 4 are disposed in spaced longitudinal relation along the casing 1. The high-voltage conductors 2–6, are aluminum or copper tubes, while the casing 1 is of steel, as is customary.

The high-voltage conductors 2, 3, 4 are supported within the casing 1 by three insulator bodies 8, which are disposed in a plane perpendicular to the axis of the casing 1 to define an empty triangular space. The insulator bodies 8 are of one-piece construction and have a shaped cross section as shown. Each body 8 which centrally supports a conductor 2, 3, 4 has two arms 7, 9 which surround a high-voltage conductor 2, 3, 4 and are shaped to define an annular reinforcement 10 about the conductor. The annular reinforcement 10 also serves to connect the inner and outer legs 11 and 12 of the profile of the body 8. As shown, the legs 11, 12 have a curvature which corresponds to that of the casing 1, with two outer arcuate portions 13 and 14 having a larger diameter than the two inner arcuate portions 15 and 16. In this way, the cross-section height decreases from the high voltage conductor toward the casing 1 so that the legs 11 and 12 converge at the ends.

The arcuate portions 13, 15 and 14, 16 of each insulator body 8 are connected at about the center of the arms 7, 9 by two webs 19, 20, while the larger cross-sectional part of the body 8 in between is constituted by cutouts 21. The insulator bodies 8 are therefore light-weight, but mechanically strong structures, which are shaped largely as beams of constant tensional stress. Upon stratification of solid and gaseous insulating materials in the direction of the electric field, the cutouts 21 also allow the gases to be stressed only slightly, so that glow discharges do not occur.

Referring to FIG. 2, for purposes of clarity, the manner in which each conductor 2, 3, 4 is mounted in an insulator body 8 will be explained by reference to the high-voltage conductor 4 in one body 8. As shown, this conductor 4 is enclosed by the flanges 11 and 12 of an insulator body 8 and a rubber ring 16 is interposed between the body 8 and conductor 4. The rubber ring 6 is fitted into a recess of the body 8 against a shoulder 18 and is compressed by a ring of insulating material 17, which is pushed against the shoulder 18 by means of suitable screws. In some cases, the ring 17 may also be equipped with external thread and screwed into a threaded hole formed in the body 8. A deformable resilient attachment of the insulator body 8 to the conductor 4 is thus obtained.

The manner in which each insulator body 8 is secured to the casing 1 will be explained for clarity by reference to one point of attachment. As shown, each insulator body 8 is provided with a recess 22 at the attachment point to the casing 1 as well as with a projection 13. The recess 22 and projection 23 of each adjacent insulator body 8 are sized so as to mate with a corresponding projection and recess, respectively, so that two such insulator bodies overlap at the common attachment point. In addition, each body 8 has a further recess which cooperates with the adjacent recess of the adjacent body to form a groove 24 in which a deformable rubber member 25 is positioned in facing relation to the casing 1. A screw 26 passes through the area of overlap of the two adjacent bodies 8 and serves to secure each together while deforming the rubber member 25 against the casing 1. The deformed rubber member 25 thus acts as a projection of the casing 1. In this way, the high-voltage conductors are secured with respect to the casing 1 elastically, but without play.

Referring to FIG. 2, the respective insulator bodies 8 of each support point are shown displaced with respect to the axis of each adjacent T connector 5 in the longitudinal direction of the casing 1. This is possible, in spite of the current forces emananting from the branch conductor 6, because the insulator bodies 8 are mechanically stable parts. They can be manufactured simply by a casting or molding process. Due to their arc-shaped construction which is matched to the wall of the casing, and the attachment points which are staggered at the circumference, the insulator bodies 8 further present such long surface-leakage paths between the high-voltage conductors 2, 3, 4 and the casing 1 that the operating and test voltages can be substantially increased over arrangements with support insulators which are disposed radially with respect to the axis of the encapsulation structure.

As the insulator bodies require no machining of the conductors or of the casing at the points of attachment, the bodies can be arranged at any desired spacing along the casing.

Figure 3:
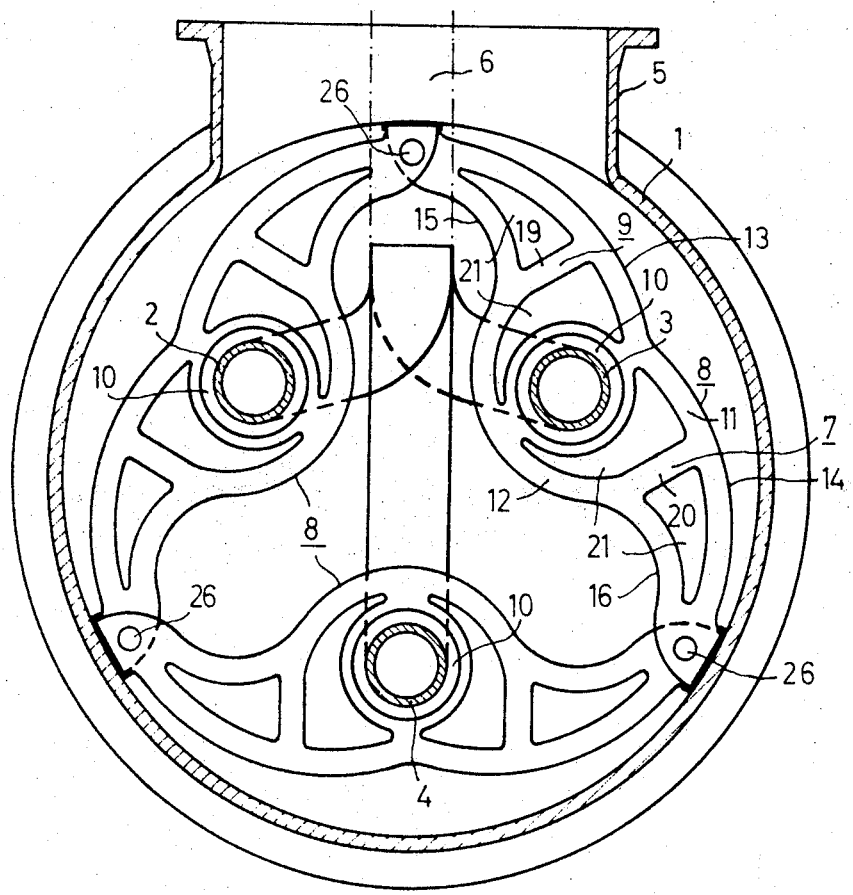
FIG. 3 illustrates a view similar to FIG. 1 of a transmission line with the conductors disposed in an equilateral triangular array.

Referring to FIG. 3, wherein like reference characters indicate like parts as above, the transmission line is provided with a cylindrical casing 1 in which the conductors 2, 3, 4 are positioned at the corners of an equilateral triangle. The conductors 2, 3, 4 are supported in the casing 1 by three insulating bodies 8 of identical and symmetrical construction. These bodies 8 are similar to the above described bodies and are connected to the casing 1 at points space 120° apart relative to the periphery of the casing 1.

What is claimed is:

1. In combination with a transmission line having a casing and three high-voltage conductors disposed in a parallel triangular array within said casing; a plurality of insulator bodies each individually mounting a respective one of said conductors within said casing, each said insulator body surrounding a respective one of said conductors at least partially and being attached at two spaced apart points to said casing, said points being circumferentially spaced at an angle of at least 90° from each other.

2. The combination as set forth in claim 1 wherein said insulator bodies are each of identical construction.

3. The combination as set forth in claim 1 wherein said points are circumferentially spaced at an angle of 120° from each other and which further includes means at each said point for fastening two adjacent insulator bodies in common to said casing.

4. The combination as set forth in claim 3 wherein said fastening means includes an inwardly directed projection on said casing and a screw passing through two adjacent insulator bodies and pressing said two bodies against said projection.

5. The combination as set forth in claim 4 wherein said projection is an elastically deformable member disposed between said two bodies.

6. The combination as set forth in claim 1 wherein said casing is of cylindrical cross-sectional shape and each insulator body has a pair of symmetrically disposed arms curved in the same sense as said casing to provide a long surface-leakage path between a respective conductor and said casing.

7. The combination as set forth in claim 1 wherein each insulator body is predominantly shaped in a cross-section perpendicular to a longitudinal axis of said casing.

8. The combination as set forth in claim 1 wherein each insulator body includes a plurality of cut-outs in a major part of said cross-section.

9. The combination as set forth in claim 8 wherein each insulator body has a pair of legs defining said cut-outs and a ring enclosing a respective one of said conductors therein.

10. The combination as set forth in claim 1 wherein each insulator body is of decreasing cross-sectional height from a point surrounding a respective conductor towards each said point of attachment to obtain an approximately uniform distribution of stresses.

11. In combination with a transmission line having a casing of cylindrical cross-sectional shape and three high-voltage conductors disposed in a parallel triangular array within said casing; a plurality of insulator bodies mounting said conductors within said casing, each said insulator body surrounding a respective one of said conductors at least partially centrally thereof and being attached at two spaced apart points to said casing, said points being circumferentially spaced at an angle of at least 90° from each other, each said insulator body having a pair of symmetrically disposed arms curved in the same sense as said casing.

12. The combination as set forth in claim 11 wherein each insulator body is of decreasing cross-sectional height from a respective conductor towards each said point.

13. The combination as set forth in claim 11 wherein each insulator body is of one-piece construction.

14. In combination with a three-phase high-voltage transmission line having a casing and three high-voltage conductors disposed in a parallel triangular array within said casing; a plurality of insulator bodies each body individually mounting a respective one of said conductors centrally thereof within said casing and being secured at opposite ends to said casing in chordal fashion relative to the cross-section of said casing, said bodies defining an empty triangular space.

* * * * *